Aug. 18, 1970 D. E. GUTHRIE 3,524,586

CARD ENCODER

Filed Nov. 12, 1968 2 Sheets-Sheet 1

INVENTOR.
DAVID E. GUTHRIE

BY Carl R. Brown

ATTORNEY

Aug. 18, 1970 D. E. GUTHRIE 3,524,586

CARD ENCODER

Filed Nov. 12, 1968 2 Sheets-Sheet 2

INVENTOR.
DAVID E. GUTHRIE

BY Carl R. Brown

ATTORNEY

United States Patent Office 3,524,586
Patented Aug. 18, 1970

3,524,586
CARD ENCODER
David E. Guthrie, 6351 Cerulan Ave., Garden Grove, Calif. 92641
Filed Nov. 12, 1968, Ser. No. 774,927
Int. Cl. G06k *1/16, 1/20*
U.S. Cl. 234—35 10 Claims

ABSTRACT OF THE DISCLOSURE

A card encoder device having a base member and an upward pivotal member at one side of the base member, which pivotal member has guides for receiving an embossed plate and a plurality of cutters that are positioned by the embossed plate, that in a single pivoting movement of the pivoting member against the base member, encodes the card and imprints the embossed printed information onto the encoded card.

BACKGROUND OF THE INVENTION

There are several known devices for encoding computer cards and tab cards for use in record files and computer recording and sorting of billings and other information. These devices transfer information from metal or plastic plates to cards that normally have printed information thereon and punched information at the edges thereof. Such known devices are complicated, have complex mechanisms with many parts, and are often sufficiently difficult to use that errors occur in transferring information to the encoded card. Many of these known devices use a punching die for punching holes in the cards that employ male and female punching dies that are complicated and difficult to use and wear out quickly. Still other devices use sensing pins for positioning the respective embossed plates and the computer cards that causes a considerable error factor in the transfer of information. Still further, the known devices often do not provide sufficient impact force to provide legible printing through several carbons that may comprise the computer card.

Thus it is advantageous to have in a single unit, an encoder for encoding computer cards and other like cards with appropriate information and to punch out apertures in the margin thereof in a distinct and positive manner, allowing the filing and appropriate transfer of information from the punch cards or encoded cards to other information retrieval and recording and processing devices, and that also has other simplified information recording means for transmitting other information relative to the embossed card to a computer or like system.

SUMMARY OF THE INVENTION

The embodiment of this invention comprises a base member having a pivoting upright member at one end with a handle member that allows the pivoting member to be pivoted downwardly with considerable force against the base member in a positive and yet simple in operation manner. The base member has a slightly resilient platen surface with appropriate aligning means for accurately positioning a card over appropriate cutting apertures on the base member. The front surface of the pivoting member has aligned guides that receive and correctly position an embossed plate for imprinting the information from the embossed plate to the encoded card upon movement of the front surface of the pivoting member to a contact position against the card on the base member. The guides, guide the embossed plate into contact with a plurality of movable pins that position, by appropriate information designated apertures in the edge of the plate, a plurality of cutting elements that project from the front surface of the pivoting member. The cutting elements coact with the cutting apertures in the upper surface of the base member to allow the programmed cutting elements to cut out openings in the outer border of the encoded card. Resiliently biased lock tabs retain the embossed plate in position in the guides and permit quick release of the embossed plate after imprinting and encoding the computer card. The pivoting member also has an inked ribbon that passes over the front surface to directly print informtion on the upper surface of the card.

The base of the encoder has sensing elements that may be appropriately positioned by the user of the encoder structure to simultaneously transfer other information, relative to the party identified by the embossed plate, through appropriate known output circuits to a computer or other information storage device. Additionally, the position of the cutters, as set by the apertures in the side of the embossed plate, actuate electrical contacts that record the position of the cutters to a computer device or other information retrieval device. The pivotal connection of the upright member relative to the base member aligned so that the forward surface of the pivoting member contacts the platen surface of the base member progressively from one side of the platen member to the other side, which progressive contact facilitates a rolling type platen contact that improves printing through multiple layers of a computer card.

The cutter members are resiliently biased to a given position and have cutting blades that are reversable, thus providing long life of the cutting knife edge, ease of replacement and economical maintenance.

It is therefore an object of this invention to provide a new and improved card encoder device for encoding cards from an embossed plate.

It is another object of this invention to provide a new and improved card encoder device that is capable of using metal, plastic, or card stock for the encoder card.

It is another object of this invention to provide a new and improved card encoder device for encoding marginal punch cards for safer sorting or tab cards for proof of file.

It is another object of this invention to provide a new and improved card encoder device that has means for appropriate attachment of a 10-key actuation device to provide variable data input to a computer or other like device.

It is another object of this invention to provide a new and improved card encoder device having double bladed cutting knives for long life, ease of replacement and economical maintenance.

It is another object of this invention to provide a new and improved card encoder device that is capable of imprinting and encoding multiple copy forms having in the order of six parts.

It is another object of this invention to provide a new and improved card encoder device that provides positive encoding of cards wtih a true go no-go actuation of the cutting knives.

Other objects and many attended advantages of this invention will become more apparent upon a reading of the following detailed description and an examination of the drawings wherein like reference characters designate like parts throughout and in which.

Figure 1:
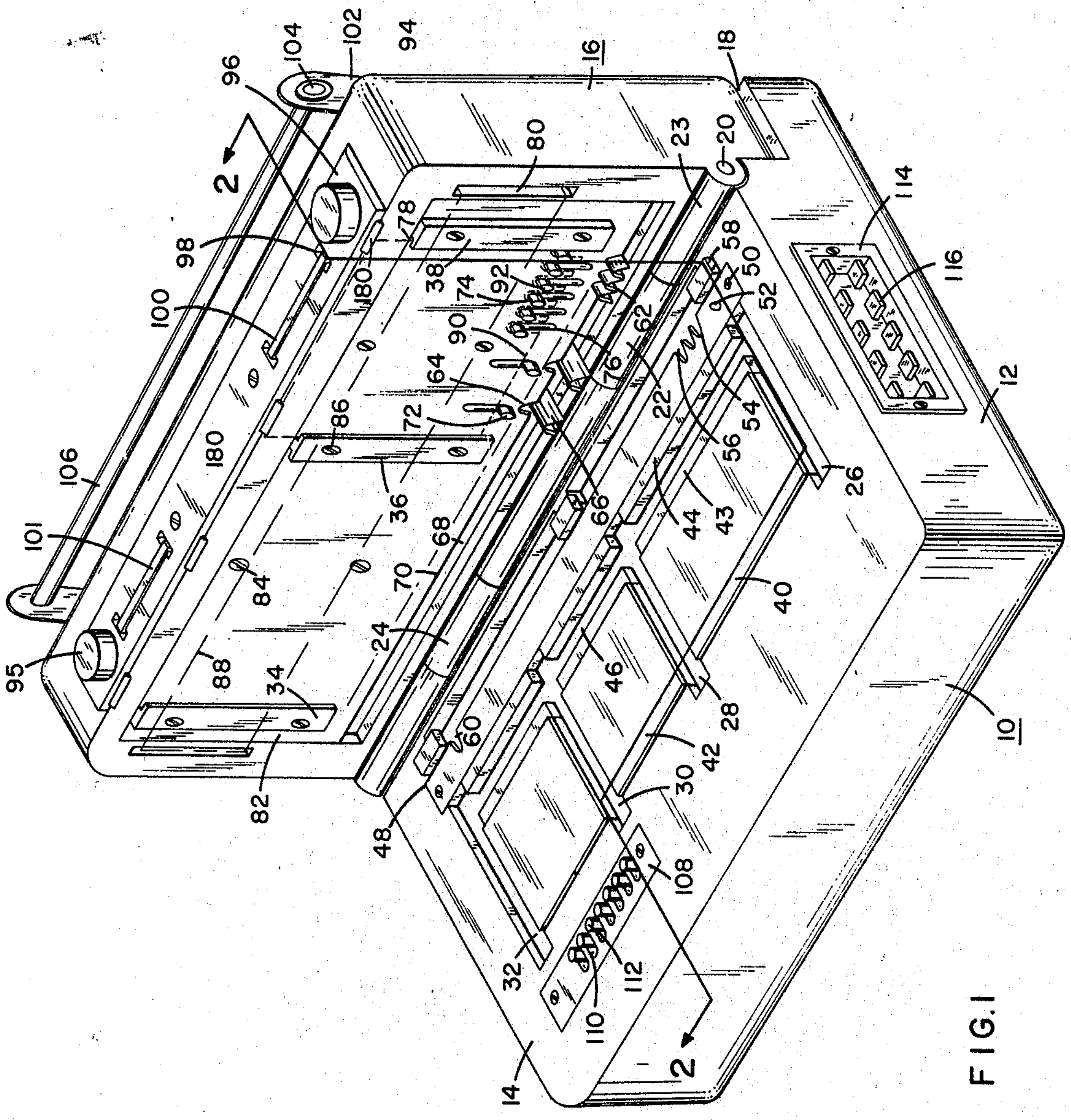
FIG. 1 is a perspective view of an embodiment of the card encoder device of this invention.
Figures 2, 3, 4:
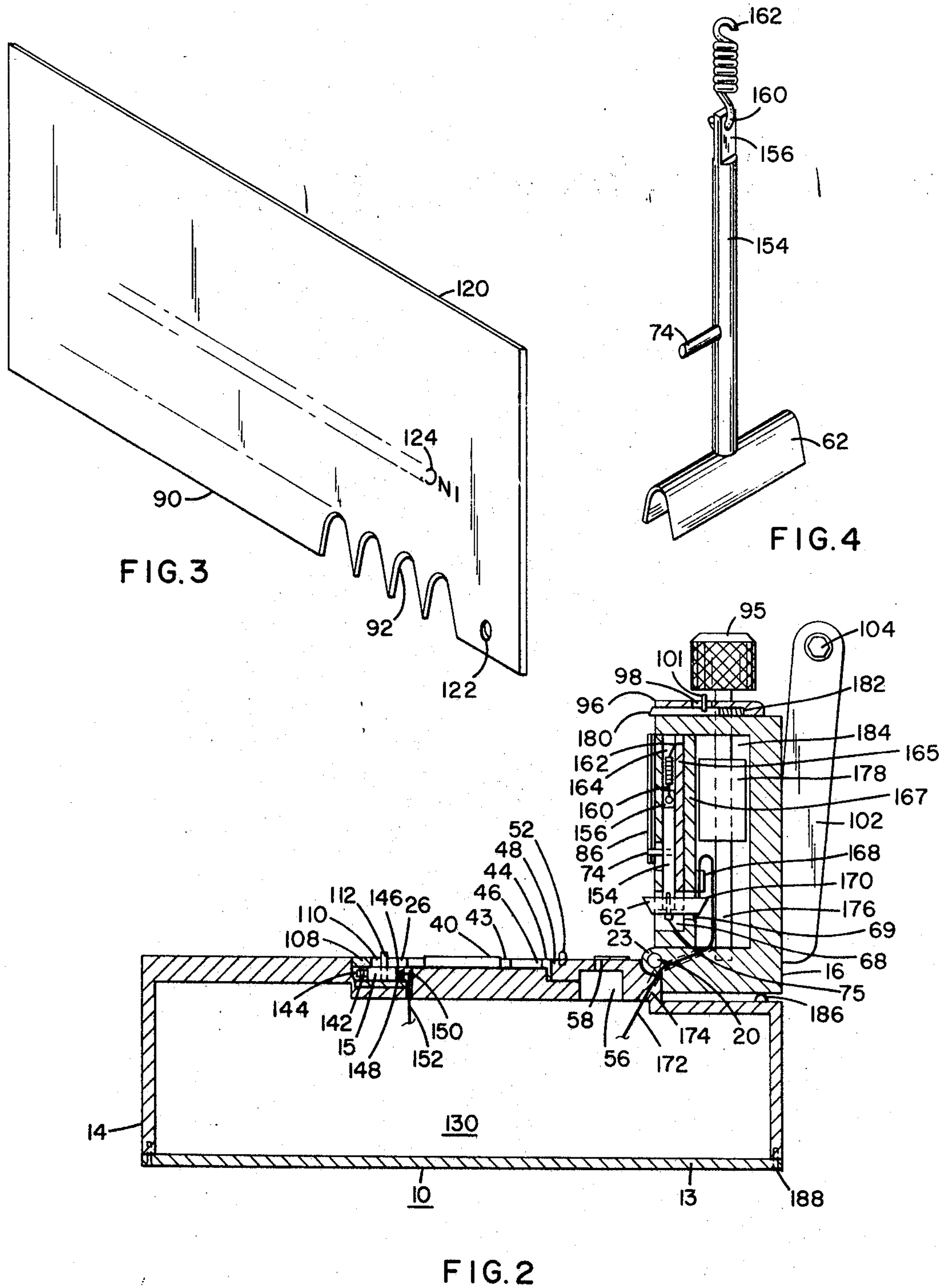
FIG. 2 is a cross sectional view taken along lines 2—2 of FIG. 1.
FIG. 3 is a perspective view of an embossed card for use in this invention.
FIG. 4 is a perspective view of a double bladed cutting knife and positioning means for use in the encoder device illustrated in FIGS. 1 and 2.

Referring now to FIGS. 1 and 2, an embodiment of the card encoder device has a base 10 and a pivotal upright member 16. The base member comprises a casting 14 with appropriate openings therein for receiving structural elements as will be explained in greater detail hereinafter. A bottom plate member 13 is secured to the bottom surface of the base member 14 by appropriate screws 88, that allow access into the volume 130 of the base member 10.

The upper flat surface of the base member 14 has an appropriate lateral opening in which is positioned a hard rubber platen 40 that may also be made of other suitable materials. The platen 40 may be secured to the base portion 14 by known adhesives or other suitable means. A plurality of slots 26, 28, 30 and 32 provide appropriate recessed spaces for receiving the guides 34, 36, and 38 that project outwardly from the forward surface of the upright pivotal member 16. It should be understood that the guide members 34, 36, and 38 may be selectively positioned by screws 86, to different lateral positions along the forward surface of the pivoting member 16, to accommodate embossed plates having different lengths. The recesses, as for example recess 30, that are not in alignment with a guide member may be appropriately filled with a section of platen material that allows imprinting on the card at positions that do not correspond with the guides.

A longitudinal opening 46, see FIGS. 1 and 2, is bordered by plate members 43 and 44 and provides an opening for receiving the forward projecting pin members 72 and 74 that position the cutting knives 62. A longitudinal cutter receiving member 48 has a plurality of openings 54 therein that are shaped to receive the cutting knife ends of cutters 62. It may be understood that the plate 48 has cutter openings 54 and 60 along the length of the cutter plate 48. The cutter plate 48 is secured and positioned by appropriate fastener means, such as screw 50. Forward of the cutter receiving openings 54 is an opening 56 that allows cut out portions to drop into the space 130 of the base member 10. This recess also provides a space for receiving the cutters, as for example cutter 66, that has been moved to a downward position in a manner that will be described in more detail hereinafter. Appropriate card stops 58 are positioned along the cutter member 48 and provide means for positioning the cards on the platen 40.

The pivotal member 16 is pivotally connected by a shaft 20 that passes through an aligned opening in portion 23 of the pivotal member 16 and through upwardly projecting ears 22 and 24 of the base member 10. Incorporated within the structure of the pivotal member 16 are spring biasing means (not shown) that encircle the shaft 20 and resiliently bias the pivotal member 16 to an upward position. The pivotal member 16, on its reverse side, has a pair of arms 102 with a connected handle member 106 spaced therebetween and secured thereto by a known connector 104. The pivotal member 16 is moved in a counter clockwise direction to contact the upper surface 14 of the base member 10 by grasping the handle 106 and pulling it forward and downwardly.

Enclosed within the pivotal member 16 are a plurality of cutting knife elements 62, see FIG. 2 and 4. The double ended cutter element 62 is secured to an upright rod member 154 by a threaded bolt 75 that allows the double, knife-edge cutter 62 to be easily interchanged or replaced. The cutter blade 62 fits into V-shaped recesses in the forward plate 82 and in the support plates 165 and 167. The rod members 154 are positioned for vertical movement in space 164. A recessed end 156 is connected to a tension spring 160 that has a curved end 162 that hooks over a slotted opening in the upper edge of the support 164. Thus the cutter blade 62 is spring biased to an upward position into respective receiving recess. While only an illustrative number of cutter elements 62 are illustrated in the embodiment in FIG. 1, it may be understood that cutter elements extend across the entire surface of the front plate 82.

An opening 68 in the front plate 82 allows the cutter blades to be moved downwardly beyond the edge surface 70. The card guides 34, 36, and 38 are secured by screws 86 to plate 82 and receive in slots 78, the embossed plate 120 as illustrated in FIG. 3. The embossed plate 12 is slidably moved in, for example, the guides 36 and 38 to a position wherein the notches 92 fit around ones of the pin members 74. The un-notched edge 90 of the embossed plate 12 contact and move the pin members 72 in slots 76. Thus the plate 120, when positioned in guides 36 and 38 as outlined by dotted line 90, moves pin member 72 and its connecting cutter blade 66 to the downward position in slot 68, wherein the cutter blade 66 does not contact the card that is positioned on the surface 14 of the base member 10. When the embossed plate 120 is in position, locking tabs 180 hold the plate 120 against the upward force of springs 60. To remove the card 120, the tabs 180 are moved inwardly into upper plate 96, see FIG. 2, against the force of spring 82 by moving the arm 100 rearwardly in slots 98. The upper plate 96 is secured to the upper surface of the pivotal member 16 by any suitable means such as screws or the like.

An inked ribbon is supported on, for example, reels 178 within the volume of pivotal member 16. The ribbon passes through openings 80, that are aligned with the guides 34, 36, and 38, and extends as outlined by dotted lines 88, across the front surface of the embossed card 120 when positioned in the guides. Knobs 94 and 95 roll the inked ribbon on axles 176.

The card encoder has means for providing electronic sensing of information on the embossed plate that is placed on the encoded card. An electric cable 172 passes through an appropriate opening 174 in the base 10 and the pivotal member 16 and is held by an insulating plate 168 to provide two-wire contact with each of the cutter elements 62 and 66, when the cutter elements are in the upper position. The cutter elements are made of electrically conductive material and thus close a low voltage and low amperage electrical circuit. The cables 172 pass through appropriate switching circuits that coact with known male collector terminals 116 that are secured in the side 12 of the base portion 14 by a suitable retaining plate 114. It may be understood that the cables 172 fit in slots (not shown) in the pivotal member 16, that allow pivotal movement of member 16 without binding the cables 172. Also other sensing information can be provided by the operator or user of the card encoder by moving switch operating pins 112 in slot 110 that move respective slide members 15 against spring members 142 in the recessed space 144. Plate 108 is secured in place by appropriate connector screws, in the upper surface of the base member 14. Slide members 15 are made of insulation material and have electrical conductor ends 146 that close upon contact the conductor ends 148 of electrical wires in cable 152. The conductor ends 148 are held in place by the longitudinal insulator 150. The electrical wires in cable 152 are electrically connected to appropriate ones of the male connectors 116, that in turn receive a suitable female plug for connecting 10-key variable data to an appropriate computer or other electronic sensing and recording device. While the appropriate connecting and switching circuits that are positioned in space 130 are not illustrated, they are well known and are within the state of the art.

In operation, an embosed plate 120, that may be made of metal, plastic or other suitable material and has raised printed information 124 thereon, which embossments may be placed on the plate 120 by tape embossments or other means, is positioned within the slots 78 of the guides 36 and 38. Bar 100 is moved rearwardly allowing the card to pass over the locking tabs 180. When the card 120 is locked in position, the lower edge 90 has moved the appropriate pins 72 and 74 and the cutting blades 62 and 66 downwardly. This position of the cutter blades 62 and 66 is reflected through the electrical cable 172 to the outptu conductors 116. A computer card or other card is positioned on the upper surface of the base 14 with the front edge of the card abutting against stops 58 and the side of the card abutting against card alignment pin 52. Card alignment pin 52 is resiliently biased to an upward position and moves easily downward against its spring, when contacted by the plate 82 of the pivoting member 16. It should also be understood that where the computer card has an alignment opening, then this alignment opening is fitted over the pin 152, which pin location corresponds with the opening 122 in the embossed card 120. This provides appropriate alignment of the computer card with the embossed plate 120.

In this position, the handle 106 is grasped and the pivoting member 16, that normally rests on resilient buttons 186, is moved downwardly into contact with a card that rests on the raised surface of the rubber platen 40 and on the cutter plate 48. The position of axle pin 20 is so aligned relative to the surface of plate 82 and the upper surface of platen 40, that the embossed plate 120 contacts the platen 40 progressively from the side adjacent the pivotal member 16 to the side opposite the pivotal member 16. This allows a rolling type contact of the embossed plate 120 against the card on the platen 40 that provides a progressive contact of the embossed portion of the embossed plate 120 against the card. This progressive contact coupled with the large force capable of being exerted through handle 106, makes it possible to imprint information through several layers of carbon in the computer card. In the contacting position, the forward knife edges of the cutters 62 pass through openings 54 in the cutter blade 48 cutting out appropriate edge notches in the computer card that gives it a configuration corresponding to the notches 92 in the embossed plate 120. The cuttings drop through opening 56 to the internal volume of the base portion 130. Upon release of the handle portion 106, the internal spring (not shown) spring biases the pivotal member 16 upwardly to a resting position on resilient buttons 186. Simultaneous with this, the user may transmit appropriate information through sensing pins 112, through cable 152 and through male contacts 116 that reflect additional information relative to the encoded computer card.

Having described my invention, I now claim:

1. A card encoder for recording information from an embossed plate onto a recording card comprising,
- a base member having an upper surface with a platen and a plate with recessed notches for receiving a card to be encoded,
- a pivotal member pivotally secured by a pivotal connection to one edge of said base member and having a front side,
- said front side having a plurality of movable cutting elements projecting therefrom for cooperating with said recessed notches in said plate to cut notches in the card,
- said front side having retainer means for receiving an embossed plate with a given edge configuration,
- and actuator means on said pivotal member that is responsive to the edge configuration of the embossed card for positioning said cutter elements to selectively cut notches in the card upon said front surface impacting against said upper surface of said base member.

2. A card encoder as claimed in claim 1 in which,
- said retainer comprises a pair of parallel aligned longitudinal guide plates positioned vertically on said front side and with each guide plate having a longitudinal groove in the side adjacent the opposite guide plate for holding the edges of an embossed plate,

- and means for selectively positioning said guide plates in different spaced positions on said front side to accommodate different sizes of embossed plates.

3. A card encoder as claimed in claim 2 in which,
- said platen having spaced slots therein for receiving said guide plates.

4. A card encoder as claimed in claim 1 in which,
- each of said cutting elements comprising a cutting blade that is secured to a vertical member,
- resilient means for resiliently biasing said vertical member and said cutting blade to an upward position in said pivotal member,
- and said actuating means comprising at least one side projecting pin that is connected to said vertical member and projects through a corresponding vertical slot in said front side in a position to be contacted and moved by the lower edge configuration of an embossed plate.

5. A card encoder as claimed in claim 4 in which,
- said front side having a plurality of vertically aligned slots,
- and each of said vertical members having a side projecting pin that projects through a respective one of said slots.

6. A card encoder as claimed in claim 5 in which,
- electrical circuit means with a plurality of electrical contacts for being selectively closed in correspondence with the vertical position of said cutting blades.

7. A card encoder as claimed in claim 5 in which,
- said front side having movable locking tabs that contact the upper edge of an embossed card and hold the lower edge of an embossed plate in contact with selective ones of said projecting pins as determined by the lower edge configuration of the embossed plate.

8. A card encoder as claimed in claim 4 in which,
- each of said cutting blades having a V-shaped cutting edge at opposite ends of said blade,
- and means for releasably securing each of said blades to each of said vertical members.

9. A card encoder as claimed in claim 1 in which,
- said platen extending across said upper surface and having an upper flat surface that is raised slightly above the remainder of said upper surface,
- said notched plate being positioned longitudinally between said platen and said pivotal connection with said recessed notches being adjacent said pivotal connection,
- and said upper surface of said base member having stop means positioned between said notches and said pivotal connection for aligning the edge of a card to be encoded with said recessed notches.

10. A card encoder as claimed in claim 9 in which,
- said pivotal member being aligned through said pivotal connection to said base to cause the embossed surface of an embossed plate to progressively contact said upper flat surface of said platen from one side of said platen to the other side of said platen.

References Cited

UNITED STATES PATENTS

| | | | |
|---|---|---|---|
| 2,233,662 | 3/1941 | Buster et al. | 234—48 |
| 2,225,313 | 12/1940 | McCart | 234—48 |
| 2,515,124 | 7/1950 | Hilton | 234—46 X |
| 2,664,815 | 1/1954 | Schuessler | 101—19 |
| 2,791,275 | 5/1957 | Hooe | 234—48 X |

WILLIAM S. LAWSON, Primary Examiner

U.S. Cl. X.R.

101—19; 234—45, 48, 79